April 5, 1927.
H. E. ANDREW
AUTOMOBILE LOCK
Filed Jan. 5, 1926   2 Sheets-Sheet 1
1,623,455
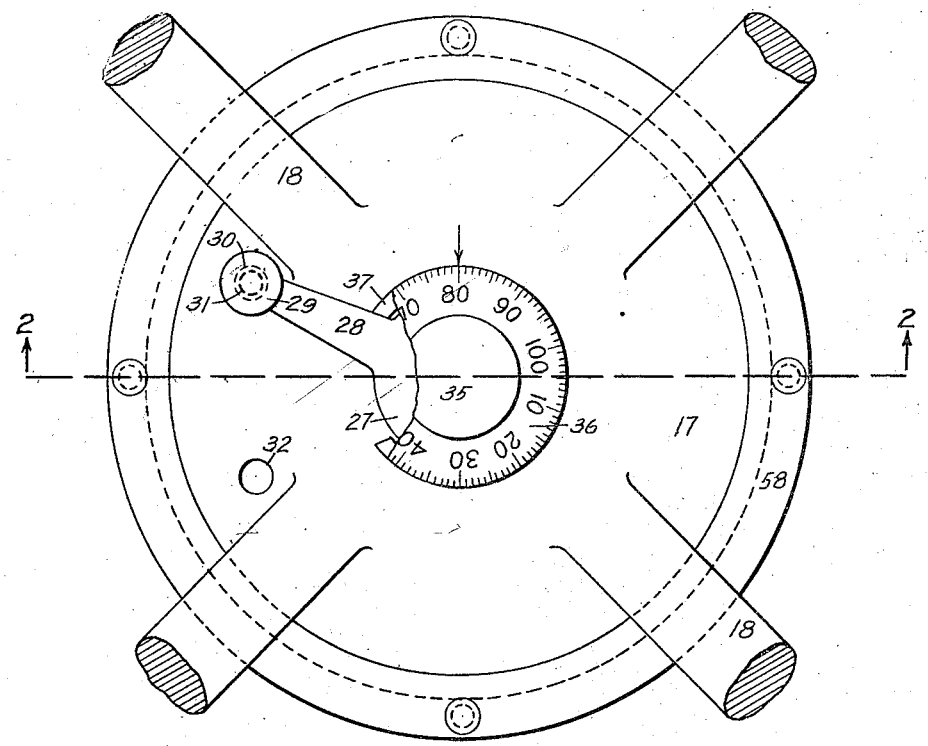
Fig. 1
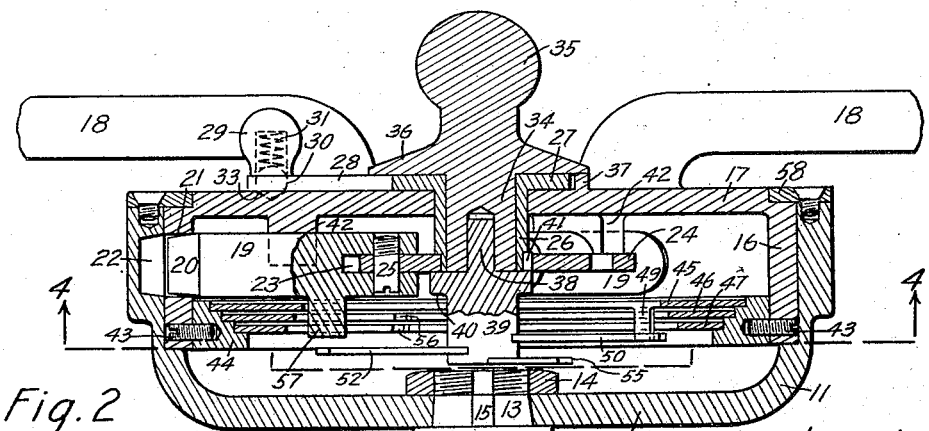
Fig. 2
Fig. 3
Inventor
H.E. Andrew
By E.B. Birkenbeul
Attorney April 5, 1927.  H. E. ANDREW  1,623,455
AUTOMOBILE LOCK
Filed Jan. 5, 1926   2 Sheets-Sheet 2

Inventor
H. E. Andrew
By C. B. Benkenbeul
Attorney

Patented Apr. 5, 1927.

1,623,455

UNITED STATES PATENT OFFICE.

HOWARD E. ANDREW, OF VANCOUVER, WASHINGTON.

AUTOMOBILE LOCK.

Application filed January 5, 1926. Serial No. 79,289.

This invention relates generally to the automobile industry, and particularly to a special form of lock adapted to prevent unauthorized use of an automobile.

The first object of this invention is to provide an exceedingly simple and efficient lock by means of which the connection between the steering wheel and steering shaft is made or broken.

The second object is to render unnecessary the employment of a key for locking or unlocking the device.

The third object is to so construct same that a great number of combinations may be had without materially affecting the construction of the parts.

The fourth object is to so construct the lock that even a skilled thief cannot readily solve the combination, as can ordinarily be done with combination locks on safes.

Figure 4:
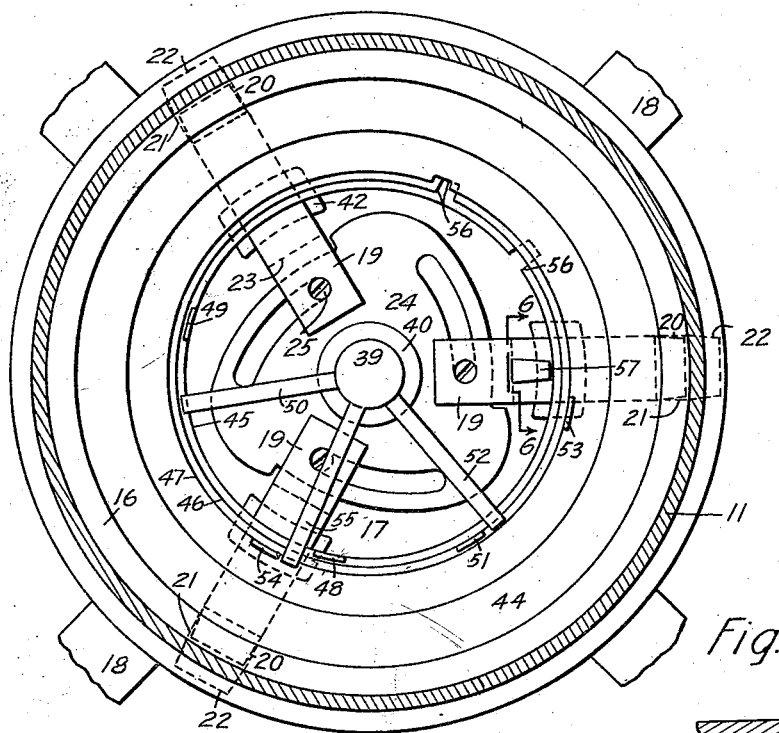
Figure 6:
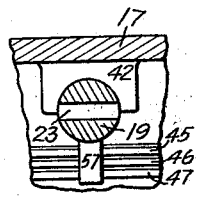
Figure 5:
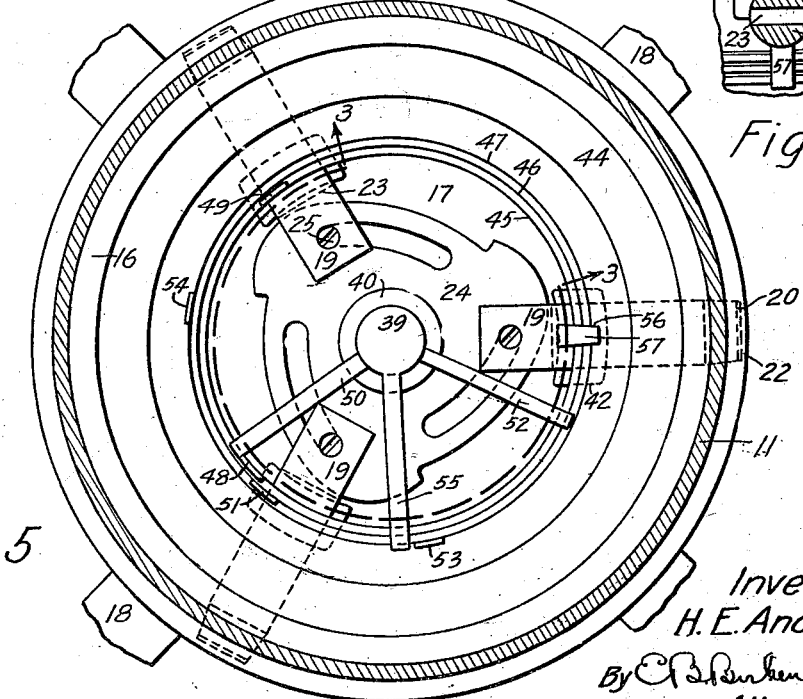

These, and other objects, will become more apparent from the specification following as illustrated in the accompanying drawings, in which:

Figure 1 is a plan of the device showing the steering wheel rim entirely cut away, as well as parts of the spokes. Figure 2 is a vertical section taken along the line 2—2 in Figure 1. Figure 3 is a development of the lock mechanism taken along the line 3—3 in Figure 5. Figure 4 is a horizontal section taken along the line 4—4 in Figure 2 showing the automobile locked or having its steering wheel freed from its steering shaft so that it could not be steered thereby. Figure 5 is a view similar to Figure 4 but showing the parts locking the steering wheel to the steering shaft. Figure 6 is a section taken along the line 6—6 in Figure 4.

Similar numbers of reference refer to similar parts throughout the several views.

Referring in detail to the drawings, on the top of the steering shaft 10 is mounted a cylindrical shell 11 whose closed end 12 fits over the tapered shank 13 of the shaft 10. A nut 14 is employed to fasten the shell 11 to the shaft 10. A key 15 on the shank 13 prevents the rotation of the member 11 with relation to the shaft 10. In other words, the shell 11 always turns with the shaft 10.

Rotatably placed within the shell 11 is a cylindrical hub 16 from whose closed end 17 radiate the spokes 18. Within the hub 16 are three radial plungers 19 whose outer ends 20 are somewhat tapered and can pass through the opening 21 made therefor in the hub 16 and when projecting from said hub can occupy the recesses 22 in the shell 11. The inner end of each plunger 19 is provided with a slot 23 which receives a cam 24 and is connected thereto by means of a headless screw 25. Rotation of the cam 24 is adapted to move all of the plungers 19 simultaneously inwardly or outwardly. The cam 24 is mounted on the lower end of a flanged sleeve 26 on whose flange 27 is formed a projecting arm 28 provided with a handle 29 in which is placed a ball 30 and spring 31.

In the closed end 17 are formed two recesses 32 and 33 in either of which the ball 30 can rest for the purpose of holding the lever 28 in either extreme position—that is to say with the plungers 19 entirely extended or withdrawn.

Rotatably mounted within the sleeve 26 is a stem 34 of a knob 35 provided with a graduated dial 36 whose outer edge rests on an annular rib 37. Into the lower end of the stem 34 is pressed the shank 38 of a plug 39 whose flanged end 40 engages the under side of the sleeve 26. A key 41 is provided between the cam 24 and the sleeve 26 to insure their proper relation. Inside of the end 17 are formed a number of saddles or guides 42 adapted to guide the plungers 19 in their movement without causing undue friction.

In the lower end of the hub 16 and by means of the screws 43 is secured a stepped bushing 44 in which are rotatably placed the upper ring 45, the middle ring 46 and the lower ring 47, all independent of each other and, owing to the nature of the steps in the bushing 44, are unable to touch each other. The central ring 46 has a larger exterior and a smaller interior diameter than the bottom ring 47 and has a larger interior and smaller exterior diameter than the upper ring 45.

Projecting downwardly from the upper ring 45 and integral with the ring 45 are the lugs 48 and 49. An arm 50 projects radially from the plug 39 and terminates between the lugs 48 and 49 at their outer lower corner. In other words—moving between these lugs the arm 50 is capable of rotating the ring 45 in either direction. The middle ring 46 is provided with only one downturned lug 51 which can be moved by the radial arm 52. On the lower ring 47 are formed the two downturned lugs 53 and 54 between which is placed the radial arm 55 on the plug 39.

In all of the rings 45, 46 and 47 are formed the slots 56 which, when properly positioned by the knob 35, will receive the lug 57 on one of the members 19.

In order to prevent the hub 16, with the attached wheel, from being lifted bodily out of the shell 11 a ring 58 is employed to hold the member 17 in its proper position. Countersunk screws with filled slots are preferably provided for holding this ring in position. In some instances it may be preferable to extend the hub 16 outside of the shell 11 and to have the ring 58 on the under side of the shell extending as far as necessary toward the shaft 10 to prevent the employment of a clamp for uniting the steering wheel to the shaft for driving purposes. These, however, are matters of construction which may be varied from in detail without departing from the spirit of this invention.

The operation of the device is as follows: Assuming that the driver of a car wishes to leave his machine so that it will not be used by anyone else, he moves the handle 29 to the position shown in Figure 1 which causes all of the plungers 19 to be withdrawn, as shown in Figure 2. A slight turn of the knob 35 will now cause one or more of the rings 45, 46 or 47 to rotate, and if this occurs even in a slight degree it will be impossible to again make the steering wheel operable, or capable of steering the car without a knowledge of the combination of the lock.

When the driver returns to his car it will be necessary for him to so manipulate the dial that all of the slots 56 will again be brought into register with the lug 57. This is brought about, for example as shown in the drawings, by first setting the middle ring 46, then the lower ring 47 and then the upper ring 45. Obviously the operator has no way of knowing which the different rings are or how they operate, being only familiar with the numbers on the dial and the direction in which the dial must be moved in order to bring about the desired results.

With the arms 50, 52 and 55 and the lugs 48, 49, 51, 53 and 54 positioned, as shown, it will be necessary for him to first turn the dial to the right to 51, then left to 54½ and then right to 78, which again causes the slots 56 to register and to enable him to move the arm 28 and to engage the ends 20 of the plungers 19 with the recesses 22.

At first glance it may appear strange that only one lug is employed on the middle ring 46. This is due to the fact that the middle ring is the basis of movement in this case, after which the next lower ring is positioned and then the uppermost ring 45, somewhat after the fashion employed in ordinary combination locks.

I am aware that various types of locks have been interposed between the steering wheel of an automobile and the steering mechanism; I therefore do not intend to cover such devices broadly, but I do intend to cover all such forms and modifications thereof as fall fairly within the appended claims.

I claim:

1. An automobile lock adapted to be placed between the steering wheel and the steering wheel shaft of an automobile, said lock having an outer shell adapted to be attached to a steering shaft; a hollow steering wheel hub rotatably mounted on said shell; a plurality of radial spokes slidably mounted in said hub adapted to project therefrom and thereby engage said shell in a manner to lock same to said hub; a cam for manually moving said plungers inwardly or outwardly; a lever for actuating said cam; a plurality of superimposed rings under said plunger concentric with and rotatably mounted in said hub, each of said rings having a slot formed in the inner side thereof; a lug on one of said plungers adapted to occupy all of said slots at one time when in register in a manner that all of said plungers can be projected from said hub, said rings having downwardly extending lugs formed thereon, each ring having the tips of its lugs at a different elevation and radius than have the lugs of the other rings; a dialed stem passing through said hub; and a plurality of arms mounted on the lower end of said stem one for each ring, each arm being adapted to engage the lugs of its ring at the extreme end of each lug and arm.

2. An automobile lock adapted to be placed between the steering wheel and the steering wheel shaft of an automobile, said lock having an outer shell adapted to be secured to said shaft; a hub forming a part of the steering wheel, said hub having means for rotatably attaching same to said shell; a plurality of plungers radially mounted within said shell adapted to lock said hub to said shell when projected; a cam for moving said plungers radially simultaneously; and means for locking said cam against rotation.

HOWARD E. ANDREW.